(12) United States Patent
Hannan et al.

(10) Patent No.: US 6,543,863 B1
(45) Date of Patent: Apr. 8, 2003

(54) TRACK SHOE

(75) Inventors: Keith Hannan, Charlestown (AU); Philip Worrall, Runcorn (AU); Steven Hall, Runcorn (AU)

(73) Assignee: The ANI Corporation Limited, Runcorn (AU)

( * ) Notice: Subject to any disclaimer, the term of this patent is extended or adjusted under 35 U.S.C. 154(b) by 0 days.

(21) Appl. No.: 09/646,380

(22) PCT Filed: Mar. 12, 1999

(86) PCT No.: PCT/AU99/00156

§ 371 (c)(1), (2), (4) Date: Sep. 8, 2000

(87) PCT Pub. No.: WO99/46158

PCT Pub. Date: Sep. 16, 1999

(30) Foreign Application Priority Data

Mar. 12, 1998 (AU) .................................... 58420/98

(51) Int. Cl.[7] .................................................. B21L 3/00
(52) U.S. Cl. ..................................... 305/201; 305/111
(58) Field of Search ................. 305/185, 196, 305/198, 200, 201, 111, 113

(56) References Cited

U.S. PATENT DOCUMENTS

| | | | | |
|---|---|---|---|---|
| 1,473,569 A | * | 11/1923 | Leyner ........................ 305/198 |
| 1,665,302 A | * | 4/1928 | Holcomb ..................... 305/185 |
| 1,693,215 A | * | 11/1928 | White ......................... 305/111 |
| 1,891,556 A | * | 12/1932 | Ronk .......................... 305/196 |
| 1,934,820 A | * | 11/1933 | Rorabeck ..................... 305/10 |
| 4,094,557 A | * | 6/1978 | Miller ......................... 305/54 |
| 4,165,137 A | * | 8/1979 | Stedman ...................... 305/54 |
| 4,425,007 A | * | 1/1984 | Soeteber ...................... 305/111 |
| 4,506,460 A | * | 3/1985 | Rudy ............................. 36/28 |
| 4,700,992 A | * | 10/1987 | Cory ............................ 305/51 |
| 4,805,968 A | * | 2/1989 | Connerley ................... 305/193 |
| 5,255,964 A | | 10/1993 | Hara | |

FOREIGN PATENT DOCUMENTS

| | | |
|---|---|---|
| GB | 2 089 747 A | 6/1982 |
| JP | 60166571 A | 8/1985 |
| JP | 6-156332 A | 6/1994 |

\* cited by examiner

*Primary Examiner*—S. Joseph Morano
*Assistant Examiner*—Frantz F. Jules
(74) *Attorney, Agent, or Firm*—Knobbe, Martens, Olson & Bear, LLP

(57) ABSTRACT

A track shoe for a crawler track has a hollow body with top and bottom sections and perimeter side walls defining a void therebetween. A supporting pillar is located in the void and extends between the top and bottom sections. The pillar is located in the main loadbearing region of the shoe and bears most of the load on the shoe. This enables the thickness of the side walls to be minimized. The shoe can be manufactured more efficiently by complementing foundry methods.

5 Claims, 4 Drawing Sheets

TRACK SHOE

THIS INVENTION relates to a track shoe for a crawler track. In particular, the invention is directed to a crawler track shoe for an electric mining shovel, although the invention is not limited to that particular use.

BACKGROUND ART

Some items of large mining machinery, such as excavators and shovels, are fitted with crawler tracks for locomotion. The individual links of the crawler tracks are known as "shoes". These shoes are linked together by pins to form an endless articulated track, each track being mounted on support rollers with sprockets at either end.

The track shoes must support a heavy weight, and are subject to high pressures. Further, the tracks are often required to operate in harsh conditions, such as stony or rock-strewn ground. Hence, the track shoes must be of sufficient size and strength to withstand such conditions.

Track shoes are normally made of cast steel or other ferrous material, and then subjected to further foundry processing, such as heat treatment, to increase strength.

To cope with the high loads and harsh operating conditions, track shoes have been made bigger, with some shoes being over 2 meters wide. However, increasing the size of the shoes increases their cost and weight. The heavier shoes are harder to handle, and increase the load to be moved.

It is known to use hollow shoes having a plurality of internal walls or ribs for strengthening. However, such internally-ribbed hollow shoes are relatively expensive and difficult to manufacture, and have limited application.

It is an object of this invention to provide an improved crawler track shoe which overcomes or ameliorates the abovedescribed disadvantages, or which at least provides the consumer with a useful choice.

SUMMARY OF THE INVENTION

In one broad form, the invention provides a track shoe for a crawler track, the track shoe having a hollow body with top and bottom portions separated by a void, characterised in that the shoe includes a supporting portion located in the void and extending between the top and bottom portions.

The term "hollow body" as used in this specification is intended to mean that the body has one or more voids or cavities therein.

Typically, the supporting portion is a pillar-like portion which is integrally cast with the body. The pillar-like portion is advantageously located under the main loadbearing region, and is surrounded by the void within the hollow body.

The pillar-like portion bears most of the load carried by the shoe, thereby enabling the thickness of the shoe walls to be minimised. The thickness may be optimised by computer-aided design using finite element analysis.

In order that the invention may be more fully understood and put into practice, a preferred embodiment will now be described with reference to the accompanying drawings.

DESCRIPTION OF PREFERRED EMBODIMENT

Figure 1:
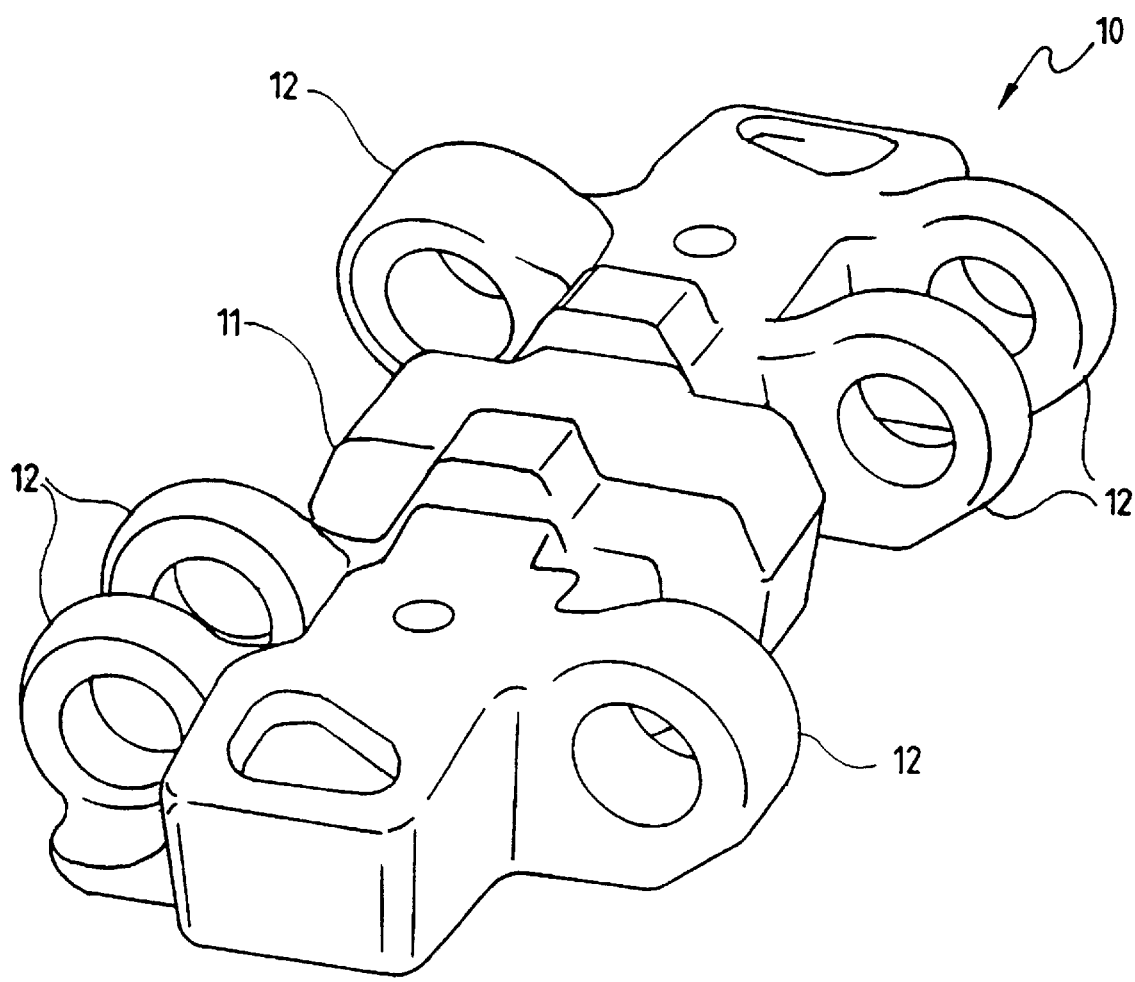
FIG. 1 is a perspective view of a track shoe according to one embodiment of this invention.

As shown in the drawings, a crawler track shoe 10 comprises a generally flat body 11 having linking lugs 12 on either side thereof. In use, adjacent track shoes are pivotally linked by pins passing through registered pin holes in overlapping lugs 12. In this manner, the shoes 10 can be chain-linked to form an endless track.

Figure 2:
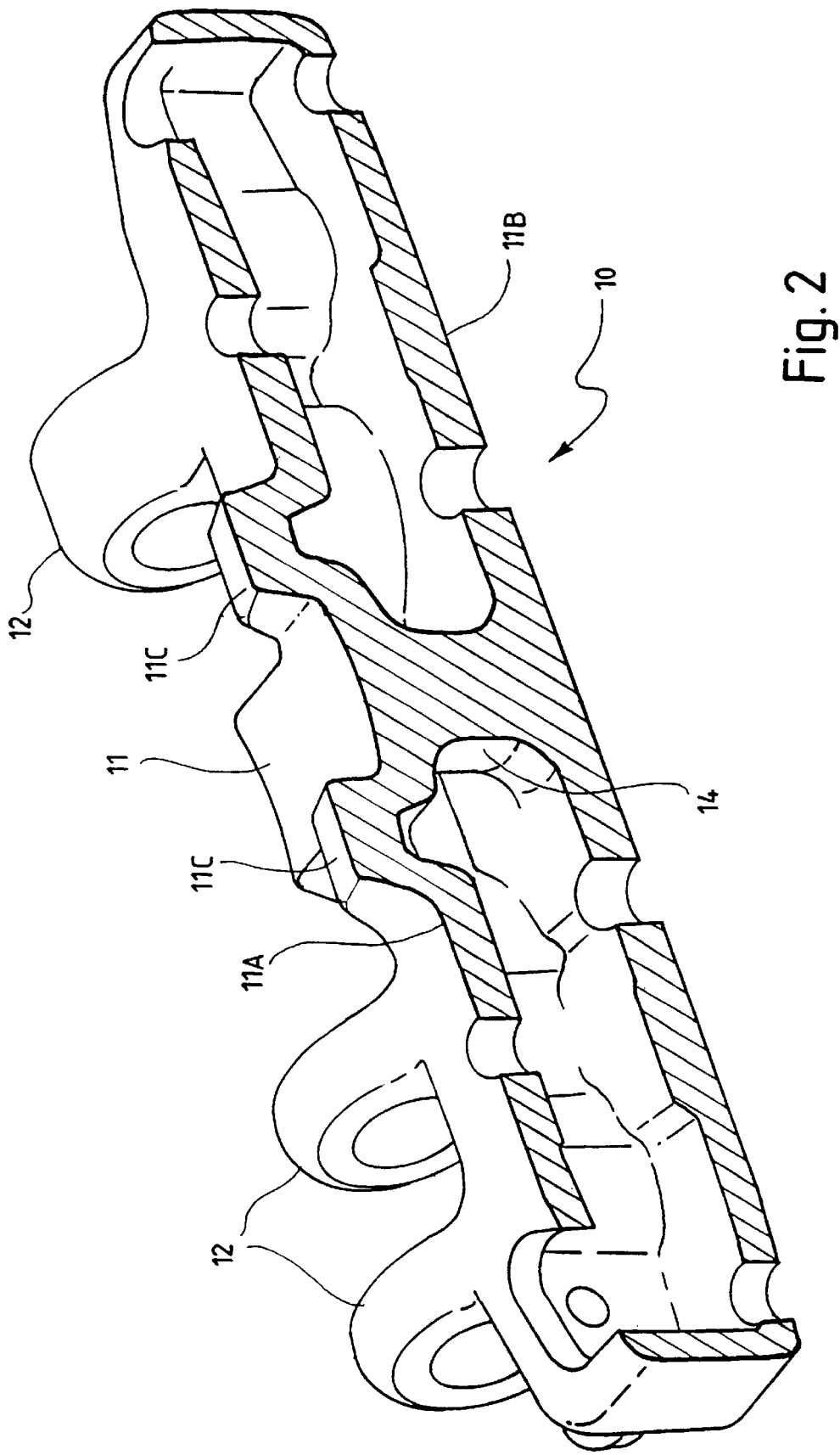
FIG. 2 is a sectional perspective view of the track shoe of FIG. 1.
Figure 3:
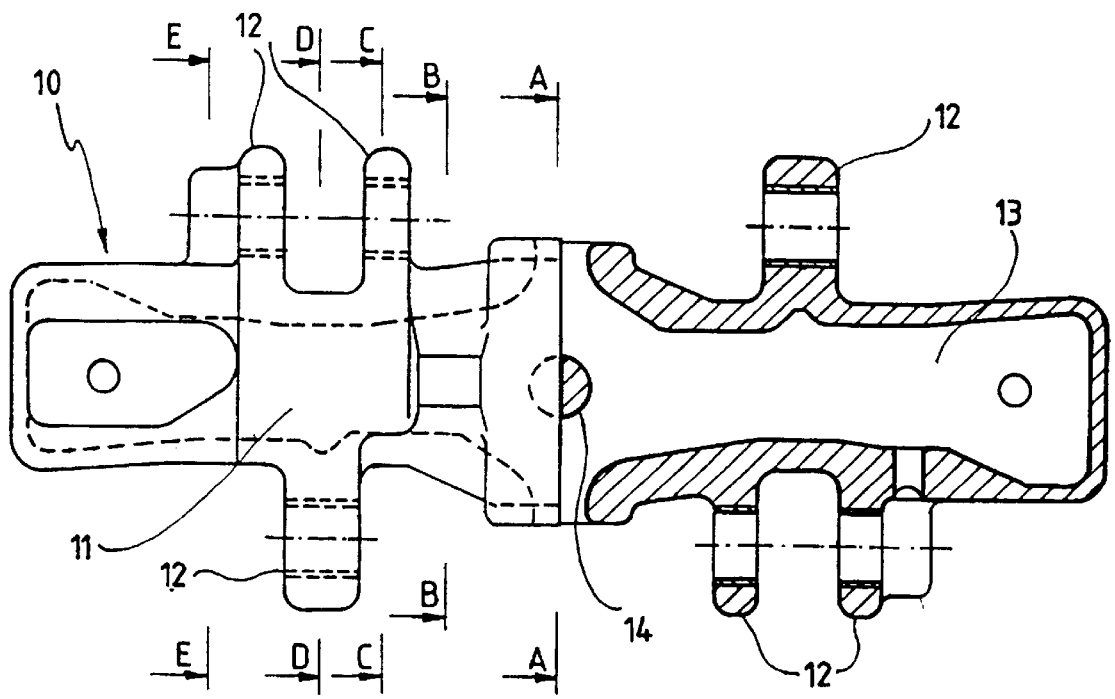
FIG. 3 is a part-sectional plan view of the track shoe of FIG. 1.
Figure 4:
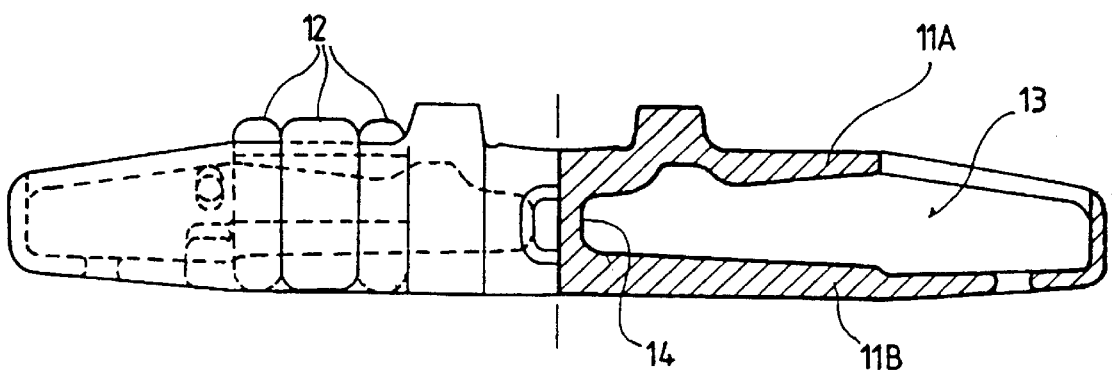
FIG. 4 is a part-sectional elevation of the track shoe of FIG. 1.
Figure 5:
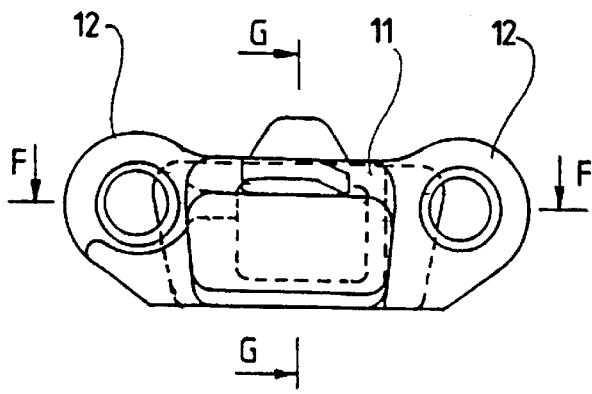
FIG. 5 is an end elevation of the track shoe of FIG. 1.
Figure 8:
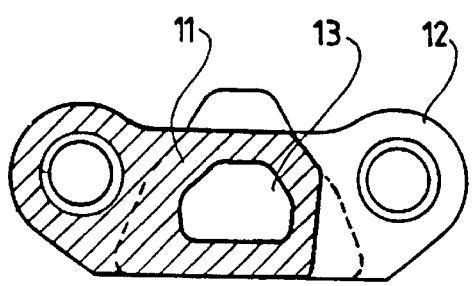
FIG. 8 is a sectional elevation along C—C of FIG. 3.
Figure 6:
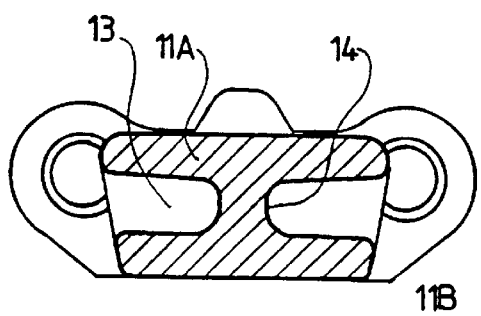
FIG. 6 is a sectional elevation along A—A of FIG. 3.
Figure 9:
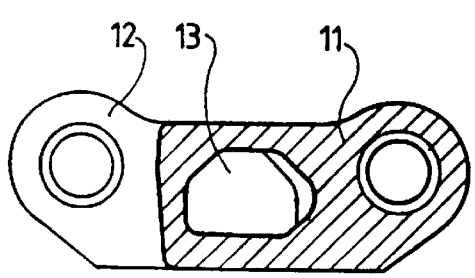
FIG. 9 is a sectional elevation along D—D of FIG. 3.
Figure 7:
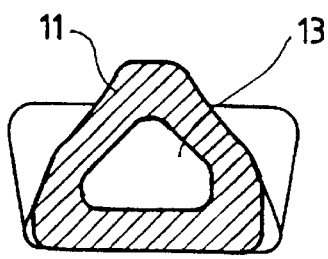
FIG. 7 is a sectional elevation along B—B of FIG. 3.
Figure 10:
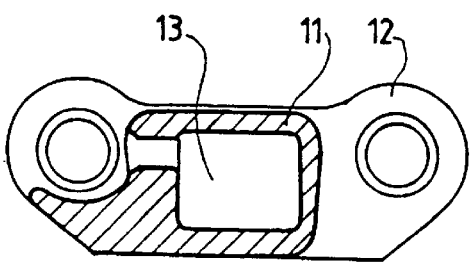
FIG. 10 is a sectional elevation along E—E of FIG. 3.

As shown more clearly in the sectional diagrams of FIGS. 2, 6–10, the body 11 is a hollow body having top and bottom portions 11A, 11B separated by a void. The top and bottom sections 11A, 11B are generally planar. The top section 11A typically has boss-like protrusions 11C which are engaged by the crawler sprockets.

The track shoe 10 has a support or reinforcing portion 14 extending between the top and bottom portions 11A, 11B and formed integrally therewith. The supporting portion 14 is preferably in the form of a short, thick pillar-like stock and, for ease of description, the support portion 14 shall be referred to as a "pillar".

The pillar 14 of the illustrated embodiment is generally circular in shape, but may be of any other suitable cross section, such as oval, square or other polygon.

The pillar 14 is typically made of the same ferrous material as the body 11, and is cast integrally with the body 11. Typically, the body and pillar are made of cast steel, which is subjected to heat treatment for added strength.

The pillar 14 is advantageously located under the main load bearing region (namely, the middle portion) of the track shoe 10. In the illustrated embodiment, the supporting portion comprises a single pillar 14 surrounded by the void of the hollow track shoe. However, the supporting portion may be in the form of a plurality of pillars located in the main load bearing region of the track shoe.

The illustrated embodiment has a number of advantages, including

By locating the pillar(s) 14 directly under the main loadbearing region, it bears most of the load. The remaining walls can therefore be made thinner, resulting in strength-to-weight benefits.

The use of the central pillar under the roller path (the main loadbearing region) significantly boosts the strength of the track shoe, and enables the track shoe to be manufactured more efficiently by known foundry methods.

The illustrated track shoe design allows bending loads to be transferred more smoothly from section to section, which reduces stress concentrations and complements foundry methods.

By locating the pillar in the main loadbearing region, the number of core pieces in the track shoe is reduced, thereby reducing the cost of manufacture.

The foregoing describes only one embodiment of the invention, and modifications which are obvious to those skilled in the art may be made thereto without departing from the scope of the invention as defined in the following claims.

What is claimed is:

1. A crawler track shoe adapted for excavation machinery, the shoe comprising a cast unipartite hollow body of generally elongate form having a load bearing top wall and a ground engaging bottom wall, the top and bottom walls being separated by an internal void, perimeter side walls extending between the top and bottom walls and at least partially surrounding the void laterally, offset connection lugs extending outwardly from respective opposite sides of the body to permit like shoes to be joined by pins inserted through aligned apertures in overlapping lugs to form a crawler track, and at least one integrally formed pillar-like supporting portion located in the void and extending between the top and bottom walls, the top wall having a roller path on the upper side thereof defining the main load bearing area of the top wall, the supporting portion being completely surrounded on all sides by the void and located directly under the roller path of the top wall so as to bear a load applied to the roller path of the shoe and thereby permit the thickness of the side walls of the hollow body to be reduced.

2. The track shoe of claim 1 is made of cast steel.

3. The track shoe of claim 1 wherein the supporting portion comprises a single pillar-like structure.

4. The track shoe of claim 1 wherein the supporting portion comprises a plurality of pillar-like structures.

5. The track shoe of claim 1 is further linked with adjacent track shoes in a manner so as to form an endless track.

* * * * *